US012670029B2

(12) United States Patent (10) Patent No.: US 12,670,029 B2
Asao et al. (45) Date of Patent: Jun. 30, 2026

(54) APPARATUS AND METHOD FOR MANAGING RESOURCE

(71) Applicant: TOYOTA JIDOSHA KABUSHIKI KAISHA, Toyota (JP)

(72) Inventors: Naoya Asao, Tokyo-to (JP); Arata Miyamoto, Kawasaki (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 54 days.

(21) Appl. No.: 17/358,613

(22) Filed: Jun. 25, 2021

(65) Prior Publication Data

US 2021/0406082 A1 Dec. 30, 2021

(30) Foreign Application Priority Data

Jun. 30, 2020 (JP) ................................. 2020-113199

(51) Int. Cl.
*G06F 9/50* (2006.01)
*G06F 9/38* (2018.01)
*G06F 9/54* (2006.01)
(52) U.S. Cl.
CPC .......... *G06F 9/5038* (2013.01); *G06F 9/3814* (2013.01); *G06F 9/3871* (2013.01); *G06F 9/544* (2013.01); *B60R 2300/10* (2013.01)
(58) Field of Classification Search
CPC ...... G06F 9/5038; G06F 9/3814; G06F 9/544; G06F 9/3871; B60R 2300/10
See application file for complete search history.

(56) References Cited

U.S. PATENT DOCUMENTS

| | | | | |
|---|---|---|---|---|
| 5,559,548 | A * | 9/1996 | Davis ................... | H04N 7/0884 |
| | | | | 725/104 |
| 6,490,611 | B1 * | 12/2002 | Shen ..................... | G06F 9/4887 |
| | | | | 718/107 |
| 10,334,050 | B2 * | 6/2019 | Kentley-Klay ........ | G06Q 10/02 |
| 11,169,526 | B2 * | 11/2021 | Yanagihara ............ | G06V 20/56 |
| 2005/0223150 | A1 | 10/2005 | Ohmoto et al. | |
| 2009/0172686 | A1 * | 7/2009 | Chen ..................... | G06F 9/4881 |
| | | | | 718/103 |
| 2016/0162335 | A1 * | 6/2016 | Sandstrom ............ | G06F 9/5016 |
| | | | | 718/103 |
| 2017/0278368 | A1 * | 9/2017 | Burke .............. | G08B 13/19656 |
| 2018/0088979 | A1 * | 3/2018 | Jiang ................... | G06F 9/45558 |
| 2020/0118294 | A1 * | 4/2020 | Nakao ...................... | G06T 1/20 |
| 2020/0148202 | A1 * | 5/2020 | Staudacher ........... | B60W 10/20 |

(Continued)

FOREIGN PATENT DOCUMENTS

| | | | |
|---|---|---|---|
| CN | 1677956 A | 10/2005 | |
| CN | 109017802 A | 12/2018 | |

(Continued)

*Primary Examiner* — Ryan M Stiglic
(74) *Attorney, Agent, or Firm* — Dickinson Wright, PLLC

(57) ABSTRACT

An apparatus for managing a resource includes a buffer memory; and a processor configured to store, when target data for each of processes is acquired, the acquired target data in the buffer memory, the processes occurring asynchronously and periodically and being assigned degrees of priority, and assign a shared resource to some of the processes for which the target data is stored in the buffer memory in descending order of the priority at every predetermined timing, the shared resource being usable for each of the processes.

4 Claims, 7 Drawing Sheets

(56)                 References Cited

U.S. PATENT DOCUMENTS

| 2021/0201555 A1* | 7/2021 | Kumar | G06T 15/503 |
| 2021/0409650 A1* | 12/2021 | Kobayashi | G08G 1/0129 |

FOREIGN PATENT DOCUMENTS

| JP | 2005-018224 A | 1/2005 |
| JP | 2009-064303 A | 3/2009 |
| JP | 2013-152636 A | 8/2013 |
| JP | 2015-011474 A | 1/2015 |

* cited by examiner

FIG. 3

APPARATUS AND METHOD FOR MANAGING RESOURCE

FIELD

The present invention relates to an apparatus and a method for managing a resource that can be used by multiple processes in common.

BACKGROUND

In a system that can execute multiple processes, two or more processes may contend for a resource that can be used by the multiple processes in common. Techniques have been proposed to inhibit execution of a high-priority process from being hindered by such contention (see, e.g., Japanese Unexamined Patent Publications Nos. 2005-18224 and 2013-152636).

For example, in the technique disclosed in Japanese Unexamined Patent Publication No. 2005-18224, upon receiving a resource acquisition request for requesting permission for access to a shared resource shared by multiple processors, a contention controller compares the degree of priority set in the resource acquisition request with, if any, that of priority of a process having an access right to the shared resource. When the degree of priority set in the resource acquisition request is higher, the contention controller delays execution of a process having transmitted the resource acquisition request for an allowable waiting time set in the resource acquisition request. When the process having the access right is not completed even after the elapse of the allowable waiting time, the contention controller suspends the process having the access right and causes the process having transmitted the resource acquisition request to be executed.

In the technique described in Japanese Unexamined Patent Publication No. 2013-152636, a contention task having higher priority than a cyclically started task is registered in a task registration table in association with the cyclically started task, and when timings of execution of the cyclically started task and the contention task coincide, an information processing device preferentially executes the contention task and forbids execution of the cyclically started task in the contention cycle.

SUMMARY

However, in the case that there is no higher-priority process to be executed when a lower-priority process requests access to a resource used in common by processes having different degrees of priority, the lower-priority process will occupy the resource. Then, when a higher-priority process requests access to the resource during execution of the low-priority process using the resource, the resource cannot be released until termination of the lower-priority process that is being executed, resulting in a delay in execution of the higher-priority process in some cases.

It is an object of the present invention to provide an apparatus for managing a resource that can shorten a wait time of a higher-priority process of multiple processes using a common resource.

According to an embodiment, an apparatus for managing a resource is provided. The apparatus includes a buffer memory; and a processor configured to store, when target data for each of processes is acquired, the acquired target data in the buffer memory, the processes occurring asynchronously and periodically and being assigned degrees of priority, and assign a shared resource to some of the processes for which the target data is stored in the buffer memory in descending order of the priority at every predetermined timing, the shared resource being usable for each of the processes.

Regarding the apparatus, the predetermined timing is preferably timing of acquisition of target data for one of the processes having the highest priority.

Regarding the apparatus, the target data for the processes is preferably sensor signals obtained from different sensors mounted on a vehicle, and each of the processes is a process to detect an object around the vehicle from one of the sensor signals obtained by one of the sensors corresponding to the process.

In this case, it is preferable that the processor is further configured to set the degrees of priority of the processes, depending on the state of travel of the vehicle.

According to another embodiment, a method for managing a resource is provided. The method includes storing, when target data for each of processes is acquired, the acquired target data in a buffer memory, the processes occurring asynchronously and periodically and being assigned degrees of priority; and assigning a shared resource to some of the processes for which the target data is stored in the buffer memory in descending order of the priority at every predetermined timing, the shared resource being usable for each of the processes.

The apparatus according to the present invention has an advantageous effect of being able to shorten a wait time of a higher-priority process of multiple processes using a common resource.

BRIEF DESCRIPTION OF DRAWINGS

FIG. 3 is a functional block diagram of a processor of the electronic control unit, related to a vehicle control process including a resource managing process.

DESCRIPTION OF EMBODIMENTS

Hereinafter, an apparatus for managing a resource, and a method therefor executed by the apparatus will be described with reference to the accompanying drawings. The apparatus manages a shared resource that can be used in common by processes occurring asynchronously and periodically and being assigned degrees of priority. To this end, upon receiving target data for each of the processes, the apparatus temporarily stores the received data in a temporary storage unit. At every predetermined timing, the apparatus assigns the shared resource in descending order of priority to some of the processes for which target data is stored in the temporary storage unit.

The following describes an example in which the apparatus for managing a resource is applied to a vehicle control system. In this example, the apparatus detects an object around a vehicle from images obtained by cameras mounted on the vehicle, and executes automated driving control of the vehicle so that the vehicle will not collide with the detected object. To this end, every time it receives an image from each of the cameras, the apparatus temporarily stores the image. At every predetermined timing, the apparatus assigns a shared resource, which is usable for processes to detect an object (hereafter, "object detecting processes"), to the object detecting processes on images obtained by the cameras and temporarily stored on a camera-by-camera basis, in descending order of priority of the cameras.

Figure 1:
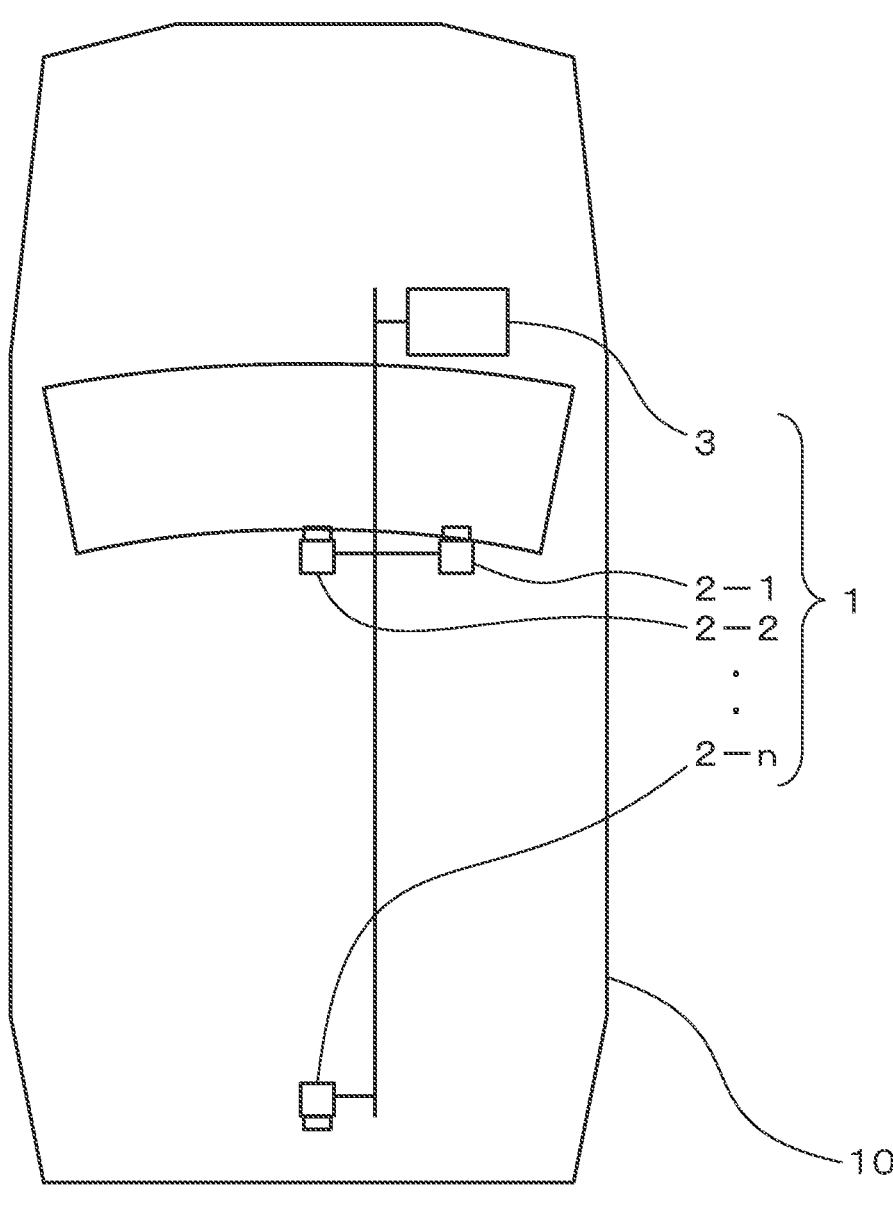
FIG. 1 schematically illustrates the configuration of a vehicle control system including an apparatus for managing a resource.
Figure 2:
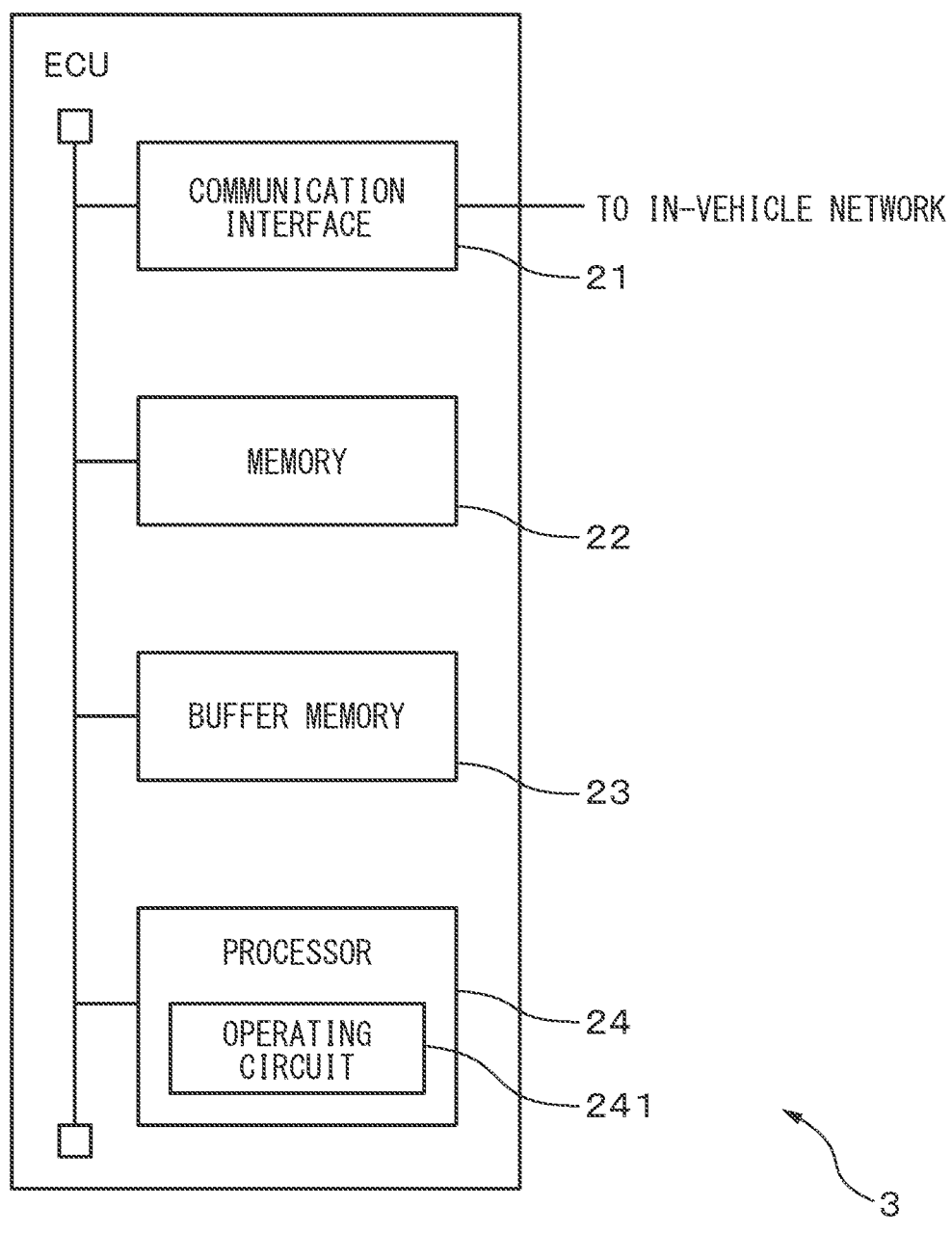
FIG. 2 illustrates the hardware configuration of an electronic control unit, which is an embodiment of the apparatus for managing a resource.

FIG. 1 schematically illustrates the configuration of a vehicle control system including an apparatus for managing a resource. FIG. 2 illustrates the hardware configuration of an electronic control unit, which is an embodiment of the apparatus for managing a resource. In the present embodiment, a vehicle control system 1, which is mounted on a vehicle 10 and controls the vehicle 10, includes cameras 2-1 to 2-$n$ ($n$ is an integer not less than two) for capturing surroundings of the vehicle 10 and an electronic control unit (ECU) 3, which is an example of the apparatus for managing a resource. The cameras 2-1 to 2-$n$ are connected to the ECU 3 via an in-vehicle network conforming to a standard, such as a controller area network, so that they can communicate with each other. The vehicle control system 1 may further include a storage device (not illustrated) that stores a map used for automated driving control of the vehicle 10. The vehicle control system 1 may further include a distance sensor (not illustrated), such as LiDAR or radar, which measures the distance to an object around the vehicle 10. The vehicle control system 1 may further include a receiver (not illustrated), such as a GPS receiver, for determining the position of the vehicle 10 in conformity with a satellite positioning system; a wireless communication terminal (not illustrated) for wireless communication with another device; and a navigation device (not illustrated) for searching for a planned travel route of the vehicle 10.

The cameras 2-1 to 2-$n$, which are an example of sensors, each include a two-dimensional detector constructed from an array of optoelectronic transducers, such as CCD or C-MOS, having sensitivity to visible light and a focusing optical system focusing an image of a target region on the two-dimensional detector. The cameras 2-1 to 2-$n$ are mounted, for example, on the vehicle 10 so as to capture surroundings of the vehicle 10. The cameras 2-1 to 2-$n$ may be mounted on the vehicle 10 in different orientations. Alternatively, two or more of the cameras 2-1 to 2-$n$ may have different focal lengths and be mounted on the vehicle 10 in the same orientation. For example, the camera 2-1 is a camera for capturing a distant region ahead of the vehicle 10, has a relatively long focal length, and is mounted in the interior of the vehicle 10 and oriented in the forward direction of the vehicle 10. The camera 2-2 is a camera for capturing a nearby region ahead of the vehicle 10, has a shorter focal length than the camera 2-1, i.e., captures a wider area than the camera 2-1, and is mounted in the interior of the vehicle 10 and oriented in the forward direction of the vehicle 10. The camera 2-3 is a camera for capturing a region behind the vehicle 10, and is oriented in the backward direction of the vehicle 10. The cameras 2-1 to 2-$n$ capture predetermined regions around the vehicle 10 asynchronously every predetermined capturing period (e.g. $\frac{1}{30}$ to $\frac{1}{10}$ seconds), and generate images representing the predetermined regions. The capturing periods of the cameras 2-1 to 2-$n$ may be equal or different. Images obtained by the cameras 2-1 to 2-$n$ may be color or gray images. Images obtained by the cameras 2-1 to 2-$n$ are an example of target data for processes occurring asynchronously and periodically and being assigned degrees of priority, and an example of sensor signals.

Every time it generates an image, each of the cameras 2-1 to 2-$n$ outputs the generated image together with identification information of the camera to the ECU 3 via the in-vehicle network.

The ECU 3 controls the vehicle 10. In the present embodiment, the ECU 3 controls the vehicle 10 so as to automatically drive the vehicle 10, depending on objects detected from time-series images obtained by each of the cameras 2-1 to 2-$n$. For this purpose, the ECU 3 includes a communication interface 21, a memory 22, a buffer memory 23, and a processor 24. The communication interface 21, the memory 22, the buffer memory 23, and the processor 24 may be different circuits or a single integrated circuit.

The communication interface 21 includes an interface circuit for connecting the ECU 3 to the in-vehicle network. In other words, the communication interface 21 is connected to the cameras 2-1 to 2-$n$ via the in-vehicle network. Every time it receives identification information and an image from one of the cameras 2-1 to 2-$n$, the communication interface 21 passes the received identification information and image to the processor 24.

The memory 22, which is an example of a storing unit, includes, for example, volatile and nonvolatile semiconductor memories. The memory 22 stores an algorithm of a vehicle control process executed by the processor 24 of the ECU 3, and various types of data and various parameters used in the vehicle control process. For example, the memory 22 stores map information, a set of parameters for specifying a classifier used in the vehicle control process, degrees of priority of the cameras 2-1 to 2-$n$, and information indicating timings of assignment of an operating circuit 241. The memory 22 also stores various types of data generated in the vehicle control process, such as information on detected objects, for a certain period.

The buffer memory 23, which is an example of the temporary storage unit, includes, for example, a volatile semiconductor memory. The buffer memory 23 temporarily stores images and identification information received from the cameras 2-1 to 2-$n$ via the communication interface 21 until execution of the object detecting processes on the respective images. The buffer memory 23 may be configured as a "first-in, first-out (FIFO)" memory. In this case, the buffer memory 23 includes separate memories for the respective cameras 2-1 to 2-$n$, each memory being configured so that an image written earlier is read out earlier. In this case, each of the memories of the buffer memory 23 temporarily stores an image from the camera corresponding to the memory until execution of the object detecting process on this image. Every time the amount of data of written images or the number thereof exceeds its capacity or a predetermined number, the buffer memory 23 may delete images in order of writing.

The processor 24 is an example of a control unit. In the present embodiment, the processor 24 includes, for example, one or more central processing units (CPUs) and a peripheral circuit thereof. The processor 24 further includes a timer circuit for keeping time. The timer circuit may be built in the CPU. The processor 24 further includes an operating circuit

241. The operating circuit 241 is an example of the shared resource, and includes, for example, a graphics processing unit (GPU) or an arithmetic circuit, such as a "neural network accelerator," tailored to a predetermined operation executed in a classifier for detecting objects (e.g., a convolution operation). The operating circuit 241 executes at least part of operations of the object detecting processes on images obtained from the cameras 2-1 to 2-n.

During travel of the vehicle 10, the processor 24 executes the vehicle control process, based on an image received from one of the cameras 2-1 to 2-n at each predetermined timing.

Figure 3:
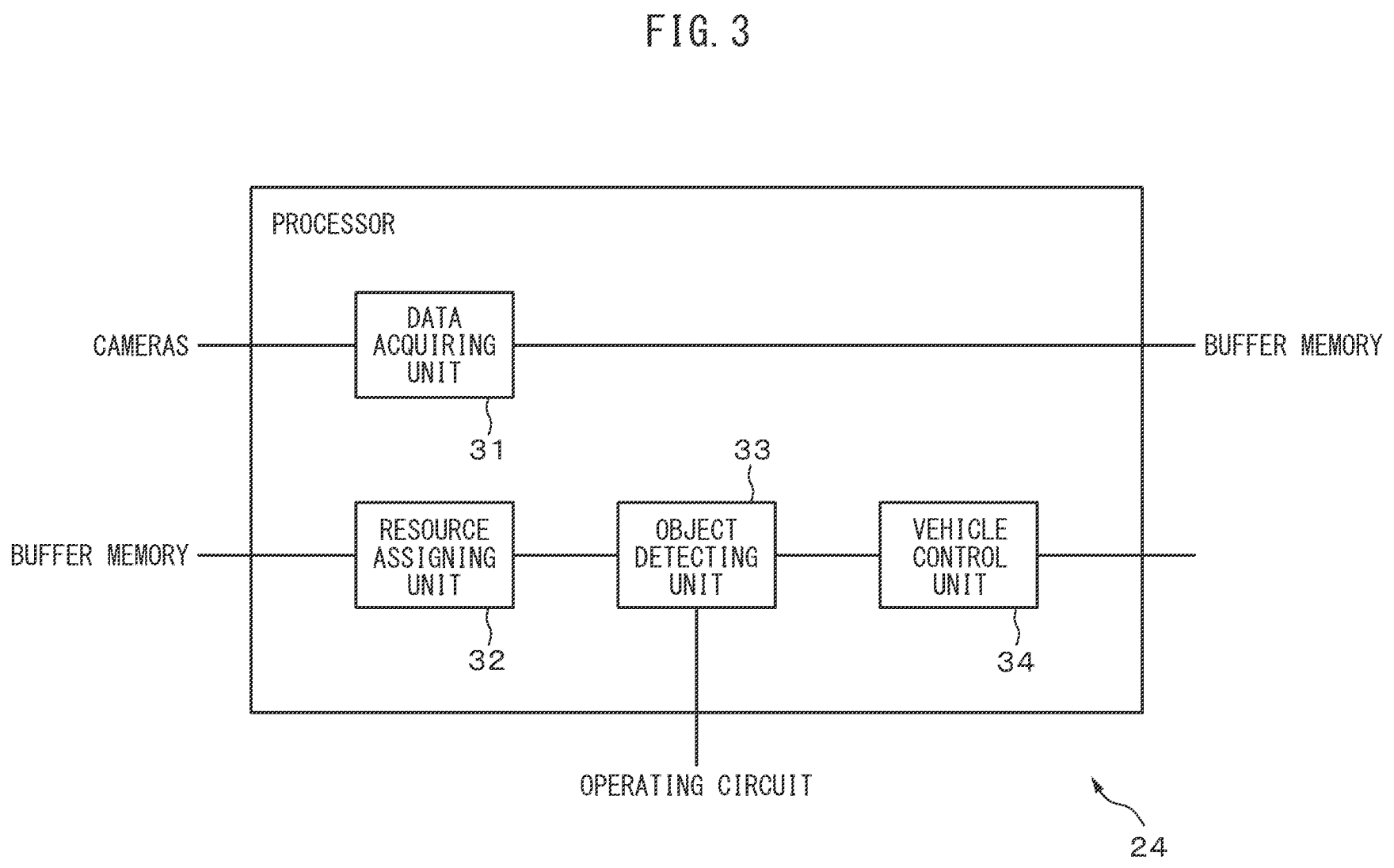

FIG. 3 is a functional block diagram of the processor 24 of the ECU 3, related to the vehicle control process including a resource managing process. The processor 24 includes a data acquiring unit 31, a resource assigning unit 32, an object detecting unit 33, and a vehicle control unit 34. These units included in the processor 24 are, for example, functional modules implemented by a computer program executed on the processor 24. Of these units included in the processor 24, processes of the data acquiring unit 31, the resource assigning unit 32, and the vehicle control unit 34 are executed on the CPU included in the processor 24. At least part of processes of the object detecting unit 33 is executed on the operating circuit 241.

The data obtaining unit 31 acquires, from each of the cameras 2-1 to 2-n, an image and identification information of the camera via the communication interface 21. The data acquiring unit 31 writes the acquired image together with the identification information of the camera and the time of acquisition in the buffer memory 23. This enables identifying the order of acquisition of images for each camera. Alternatively, in the case that the buffer memory 23 includes separate FIFO memories for the respective cameras 2-1 to 2-n, the data acquiring unit 31 may refer to the identification information received together with an image and write the image in the memory corresponding to the camera, of the cameras 2-1 to 2-n, specified by the identification information.

The resource assigning unit 32 assigns the operating circuit 241 at every predetermined timing in order for the object detecting unit 33 to execute the object detecting processes on images obtained from the cameras 2-1 to 2-n. In other words, the object detecting processes on images obtained from the cameras 2-1 to 2-n are an example of the processes executed by the shared resource.

In the present embodiment, the resource assigning unit 32 assigns the operating circuit 241 so that the operating circuit 241 will execute, in descending order of priority, the object detecting processes on target images stored in the buffer memory 23 and obtained by one or more of the cameras 2-1 to 2-n. To this end, the resource assigning unit 32 may refer to the degrees of priority of the cameras 2-1 to 2-n stored in the memory 22 to identify, of the images stored in the buffer memory 23, an image obtained by the highest-priority camera. The resource assigning unit 32 then generates assignment information indicating the identified image, and notifies the object detecting unit 33 of the generated assignment information.

Upon notification of termination of the executed object detecting process from the operating circuit 241, the resource assigning unit 32 releases the operating circuit 241 so that the operating circuit 241 can be assigned for the next image.

Figures 4A, 4B:
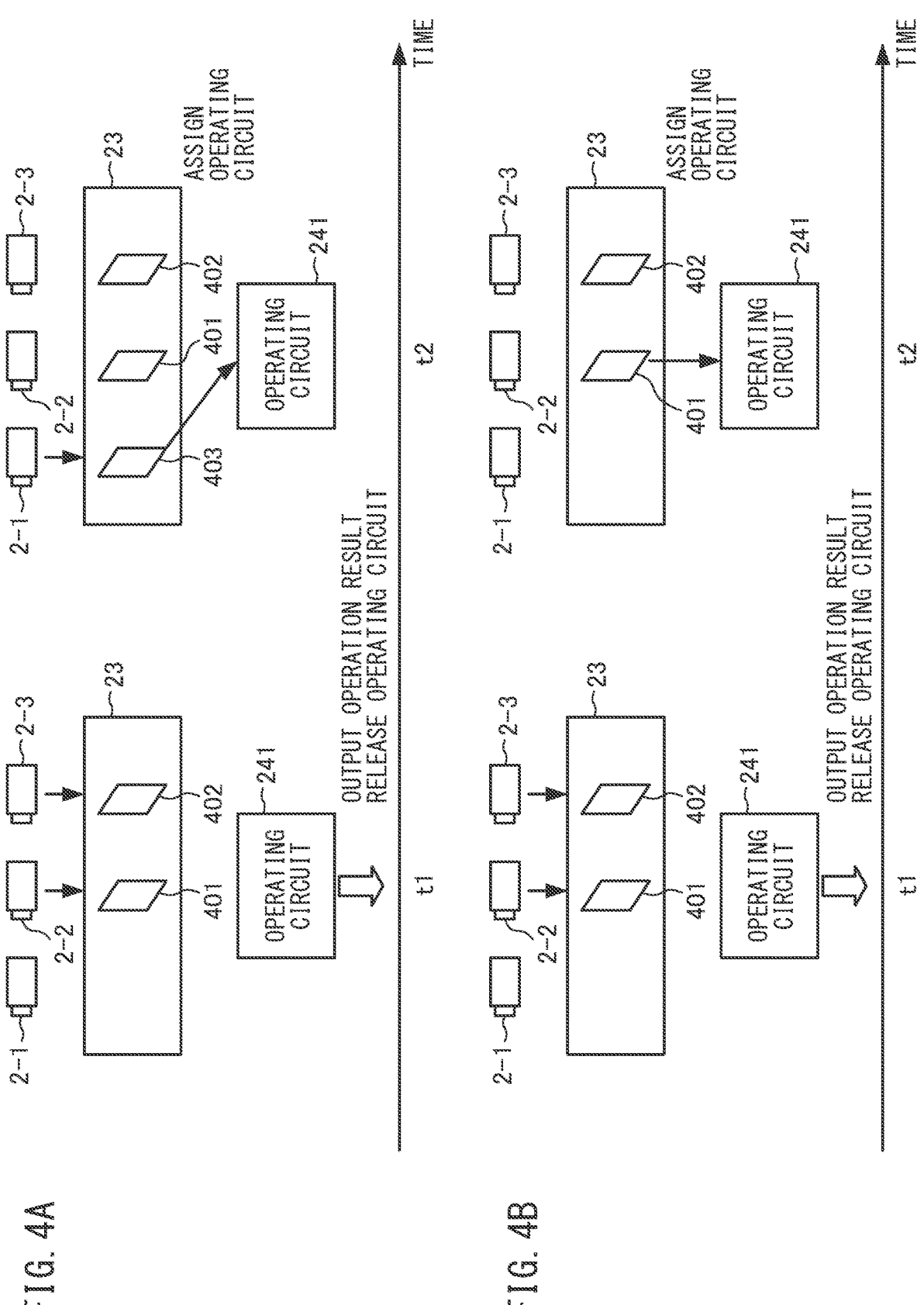
FIG. 4A is a diagram for briefly explaining assignment of an operating circuit.
FIG. 4B is a diagram for briefly explaining assignment of an operating circuit.

FIGS. 4A and 4B are diagrams for briefly explaining assignment of the operating circuit 241 executed by the resource assigning unit 32. In this example, assume that n=3, i.e., three cameras 2-1 to 2-3 are provided for the vehicle 10.

Of these cameras, assume that the object detecting process on an image obtained by the camera 2-1 has the highest priority, and the object detecting process on an image obtained by the camera 2-3 has the lowest priority.

In the case illustrated in FIG. 4A, images 401 and 402 respectively obtained by the cameras 2-2 and 2-3 are stored in the buffer memory 23 at timing t1 when the result of operations is outputted from the operating circuit 241 and the operating circuit 241 is released. Since timing t1 is not a timing of assignment of the operating circuit 241, the resource assigning unit 32 waits without assigning the operating circuit 241 until timing t2 of assignment of the operating circuit 241. In other words, at timing t1, the operating circuit 241 is assigned to neither the object detecting process on the image 401 nor the object detecting process on the image 402. Thereafter, an image 403 obtained by the camera 2-1 is written in the buffer memory 23 by timing t2 of assignment of the operating circuit 241. Hence, at timing t2, the resource assigning unit 32 assigns the operating circuit 241 to the object detecting process on the image 403 from the highest-priority camera 2-1.

In the case illustrated in FIG. 4B, images 401 and 402 respectively obtained by the cameras 2-2 and 2-3 are stored in the buffer memory 23 at timing t1 of release of the operating circuit 241, and the resource assigning unit 32 waits until timing t2 without assigning the operating circuit 241. However, in this case, at timing t2, no image obtained by the camera 2-1 is written in the buffer memory 23. Hence, at timing t2, the resource assigning unit 32 assigns the operating circuit 241 to the object detecting process on the image 401 from the second-highest-priority camera 2-2.

The predetermined timing is preferably timing of acquisition of target data for the highest-priority process of the processes to which the operating circuit 241 is assigned. More specifically, in the above-described examples, the predetermined timing is preferably timing of writing an image from the camera 2-1 in the buffer memory 23. This enables the resource assigning unit 32 to assign the operating circuit 241 to the object detecting process on an image from the highest-priority camera of the cameras 2-1 to 2-n without delay.

However, in the case that an expected time required for the operating circuit 241 to execute a process on other data is shorter than a waiting time from release of the operating circuit 241 to the next timing of acquisition of target data for the highest-priority process, the resource assigning unit 32 preferably assigns the operating circuit 241 to the process on other data. More specifically, in the examples of FIGS. 4A and 4B, the resource assigning unit 32 compares, at timing t1, an expected time required to execute the object detecting process on an image obtained by the camera 2-2 or 2-3 and stored in the buffer memory 23 with a waiting time until the next timing of writing an image obtained by the camera 2-1 in the buffer memory 23. In the case that the expected time required to execute the object detecting process for the camera 2-2 or 2-3 is shorter than the waiting time, the resource assigning unit 32 assigns the operating circuit 241 at timing t1 to the object detecting process on an image obtained by the camera 2-2 or 2-3. In the case that the expected time required to execute the object detecting process for any of the cameras is not shorter than the waiting time, the resource assigning unit 32 waits until timing t2 without assigning the operating circuit 241, as described above. However, in this case, the lower the priority of a process, the more infrequently the operating circuit 241 is assigned to this process. Thus, the highest-priority data of the next cycle may be written in the buffer memory 23 before assignment of the operating circuit 241 so as to temporarily raise the priority of the camera for which the object detecting process has been skipped to the second highest. This enables the resource assigning unit 32 to successively assign the operating circuit 241 to processes on lower-priority data. The resource assigning unit 32 may calculate the expected time required to execute a process on other data, for example, as the average of times required of a predetermined number of times of recent execution of the process on this data. Alternatively, the expected time required to execute a process on other data may by prestored in the memory 22.

Figure 5:
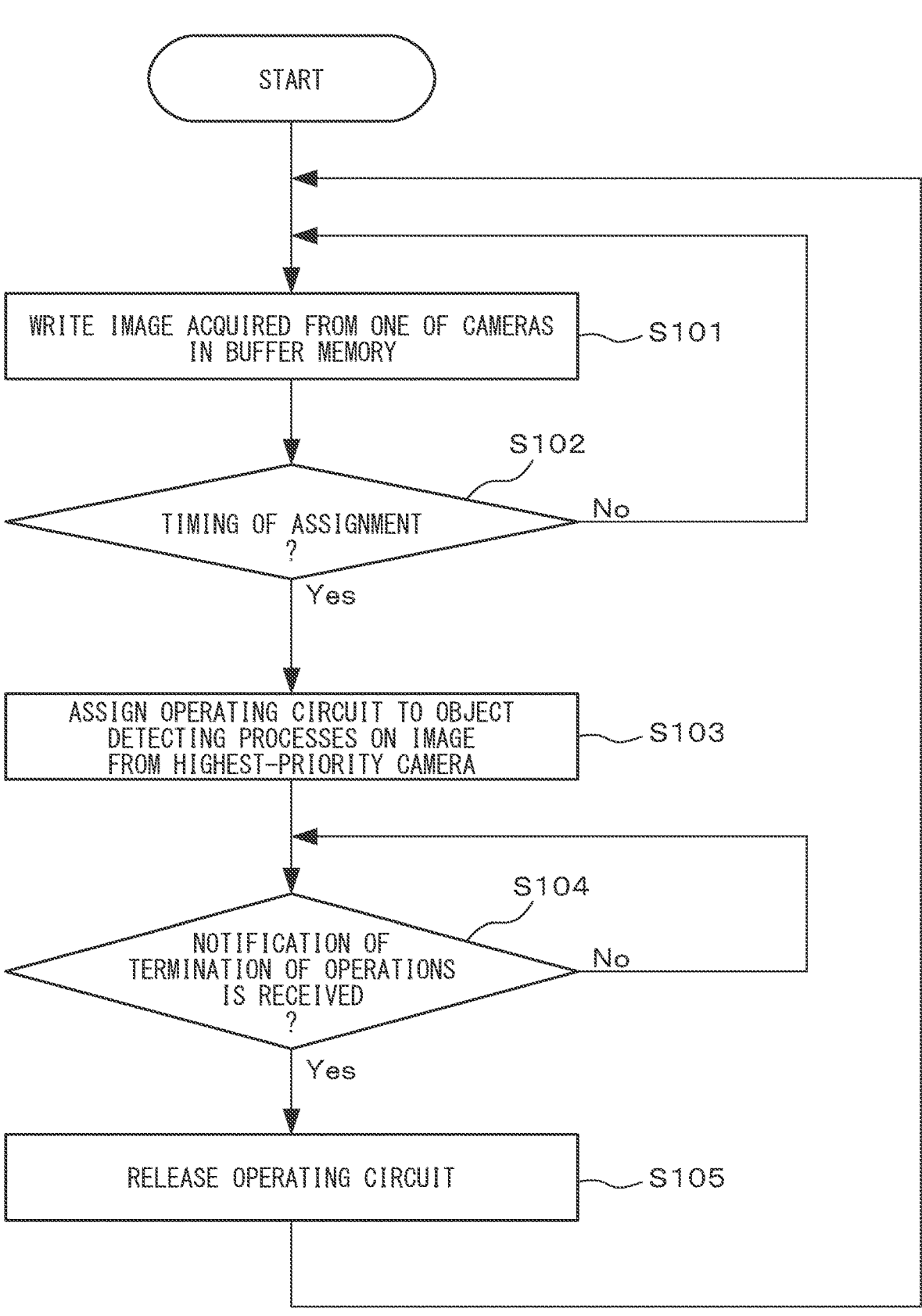
FIG. 5 is an operation flowchart of the resource managing process.

FIG. 5 is an operation flowchart of the resource managing process executed by the processor 24.

Every time it acquires an image from one of the cameras 2-1 to 2-*n* via the communication interface 21, the data acquiring unit 31 of the processor 24 writes the acquired image in the buffer memory 23 (step S101).

The resource assigning unit 32 of the processor 24 determines whether the current time is a predetermined timing of assignment of the operating circuit 241 (step S102). When the current time is not a predetermined timing, (No in Step S102), the resource assigning unit 32 repeats the process of step S101 and the subsequent step.

When the current time is a predetermined timing (Yes in Step S102), the resource assigning unit 32 assigns the operating circuit 241 to the object detecting process on an image obtained from the highest-priority camera and stored in the buffer memory 23 (step S103). Thereafter, the resource assigning unit 32 determines whether a notification indicating termination of operations by the operating circuit 241 is received from the object detecting unit 33 (step S104).

When a notification indicating termination of operations by the operating circuit 241 is not received (No in Step S104), the resource assigning unit 32 repeats the process of step S104 at regular intervals. When a notification indicating termination of operations by the operating circuit 241 is received (Yes in Step S104), the resource assigning unit 32 releases the operating circuit 241 (step S105). Thereafter, the processor 24 repeats the process of step S101 and the subsequent steps.

In some cases, the total execution time of the object detecting processes on images obtained by the cameras 2-1 to 2-*n* may be longer than the cycle in which the highest-priority camera acquires images. In such a case, an image will be acquired from the highest-priority camera before termination of the object detecting process on an image from a low-priority camera. Thus, when the image of the next cycle from the highest-priority camera is written in the buffer memory 23, the resource assigning unit 32 may set the order of assignment of the operating circuit 241 according to the degrees of priority for all of the images obtained from the cameras and already written in the buffer memory 23. Then, the resource assigning unit 32 may successively assign the operating circuit 241 to the object detecting processes on the images according to this order. Until termination of the object detecting processes on these images, the resource assigning unit 32 delays execution of the object detecting process on the image of the next cycle from the highest-priority camera even if the image of the next cycle from the highest-priority camera is written in the buffer memory 23. The resource assigning unit 32 skips assignment of the operating circuit 241 to the object detecting processes on the images of the next cycle in ascending order of priority of the cameras so as to shorten the time of processing on the images of the next cycle by the wait time of the object detecting process on the image of the next cycle from the highest-priority camera. In the case that the wait time of the object detecting process on the image of the next cycle from the highest-priority camera is longer than the capturing period of this camera, the resource assigning unit 32 may omit to assign the operating circuit 241 to the object detecting process on any of the images from the cameras so as to skip the object detecting processes on the images of the next cycle from the respective cameras. This causes a little wait time of the object detecting process on an image from the highest-priority camera, but enables the resource assigning unit 32 to assign the operating circuit 241 to the object detecting processes on images from the respective cameras on a certain cycle.

The object detecting unit 33 uses the operating circuit 241 to execute the object detecting process on an image obtained by one of the cameras when notified of assignment of the operating circuit 241 to the object detecting process on this image from the resource assigning unit 32. More specifically, the object detecting unit 33 reads out, from the buffer memory 23, the image indicated by the assignment information notified from the resource assigning unit 32 and passes it to the operating circuit 241 to execute the object detecting process on this image. Through this object detecting process, the object detecting unit 33 detects a detection target object represented in the image and located around the vehicle 10.

In the present embodiment, the object detecting unit 33 inputs an image into a classifier to detect an object region including a detection target object represented in the image and to identify the type of the detection target object. Examples of detection target objects include vehicles; pedestrians; road markings, such as lane dividing lines; various signposts; and traffic lights. As such a classifier, the object detecting unit 33 may use, for example, a "deep neural network" (hereafter simply "DNN") having a convolutional neural network (hereafter simply "CNN") architecture, such as a Single Shot MultiBox Detector (SSD) or a Faster R-CNN. Such a classifier is trained in advance with a large number of images representing a detection target object (training images) in accordance with a training technique, such as backpropagation.

The object detecting unit 33 causes the operating circuit 241 to execute at least part of operations by the classifier to shorten the time required to execute the object detecting process. For example, the object detecting unit 33 causes the operating circuit 241 to execute, of the operations by the classifier, a convolution operation of a convolution layer, a pooling operation of a pooling layer, and a softmax operation of a softmax layer.

Upon detection of a detection target object from an image, the object detecting unit 33 outputs information indicating the position and area of the object region in the image representing the detection target object and the type of the object included in the object region to the vehicle control unit 34. Additionally, the object detecting unit 33 notifies the resource assigning unit 32 of termination of the process by the operating circuit 241.

The vehicle control unit 34 generates one or more planned trajectories of the vehicle 10 in the nearest predetermined section (e.g., 500*m* to 1 km) so that the vehicle 10 will travel along a planned travel route to a destination. Each planned trajectory is represented, for example, as a set of target positions of the vehicle 10 at respective time points during travel of the vehicle 10 through the predetermined section. The vehicle control unit 34 controls components of the vehicle 10 so that the vehicle 10 will travel along the planned trajectory.

The vehicle control unit 34 generates a planned trajectory so that the vehicle 10 will not collide with objects around the vehicle 10 (e.g., other vehicles) detected from time-series images obtained by each of the cameras 2-1 to 2-*n*. For this purpose, the vehicle control unit 34 tracks objects detected by the object detecting unit 33.

For example, for each of the cameras 2-1 to 2-*n*, the vehicle control unit 34 applies a tracking process based on optical flow, such as the Lucas-Kanade method, to an object region of interest in the latest image and the object regions in the past images obtained by the camera, thereby tracking the object represented in the object regions. To this end, the vehicle control unit 34 applies, for example, a filter for extracting characteristic points, such as SIFT or Harris operator, to the object region of interest, thereby extracting characteristic points from this object region. Then, the vehicle control unit 34 may identify those points in the object regions in the past images which correspond to the characteristic points in accordance with the applied tracking technique, thereby calculating the optical flow. Alternatively, the vehicle control unit 34 may apply another tracking technique, which is applied for tracking a moving object detected from an image, to the object region of interest in the latest image and the object regions in the past images, thereby tracking the object represented in the object regions.

For each tracked object, the vehicle control unit 34 executes viewpoint transformation, using information such as the positions where the cameras 2-1 to 2-*n* are mounted on the vehicle 10, thereby transforming the image coordinate of the object into a coordinate in an aerial image ("aerial-image coordinate"). To this end, the vehicle control unit 34 can estimate the positions of the detected objects at acquisition of each image, using the position and orientation of the vehicle 10, estimated distances to the detected objects, and the directions from the vehicle 10 to the objects at acquisition of each image. The position and orientation of the vehicle 10 at acquisition of each image may be estimated by comparing the image obtained by one of the cameras 2-1 to 2-*n* with a high-precision map. Additionally, of the trajectories of the objects tracked by different cameras, the vehicle control unit 34 may combine trajectories that at least overlap as the trajectory of the same object. The vehicle control unit 34 can predict a trajectory of the object to a predetermined time ahead, using, for example, a Kalman filter or a particle filter to execute a predicting process on sequential aerial-image coordinates.

The vehicle control unit 34 generates a planned trajectory of the vehicle 10, based on the predicted trajectories of the tracked objects, so that a predicted distance between the vehicle 10 and any of the tracked objects will be not less than a predetermined distance until a predetermined time ahead. The vehicle control unit 34 may generate multiple planned trajectories. In this case, the vehicle control unit 34 may select one of the planned trajectories such that the sum of the absolute values of acceleration of the vehicle 10 is the smallest.

Upon setting a planned trajectory, the vehicle control unit 34 controls components of the vehicle 10 so that the vehicle 10 will travel along the planned trajectory. For example, the vehicle control unit 34 determines a target acceleration of the vehicle 10 according to the planned trajectory and the current speed of the vehicle 10 measured by a vehicle speed sensor (not illustrated), and sets the degree of accelerator opening or the amount of braking so that the acceleration of the vehicle 10 will be equal to the target acceleration. The vehicle control unit 34 then determines the amount of fuel injection according to the set degree of accelerator opening, and outputs a control signal depending on the amount of fuel injection to a fuel injector of the engine of the vehicle 10. Alternatively, the vehicle control unit 34 outputs a control signal depending on the set amount of braking to the brake of the vehicle 10.

When the vehicle control unit 34 changes the course of the vehicle 10 in order for the vehicle 10 to travel along the planned trajectory, the vehicle control unit 34 determines the steering angle of the vehicle 10 according to the planned trajectory and outputs a control signal depending on the steering angle to an actuator (not illustrated) controlling the steering wheel of the vehicle 10.

Figure 6:
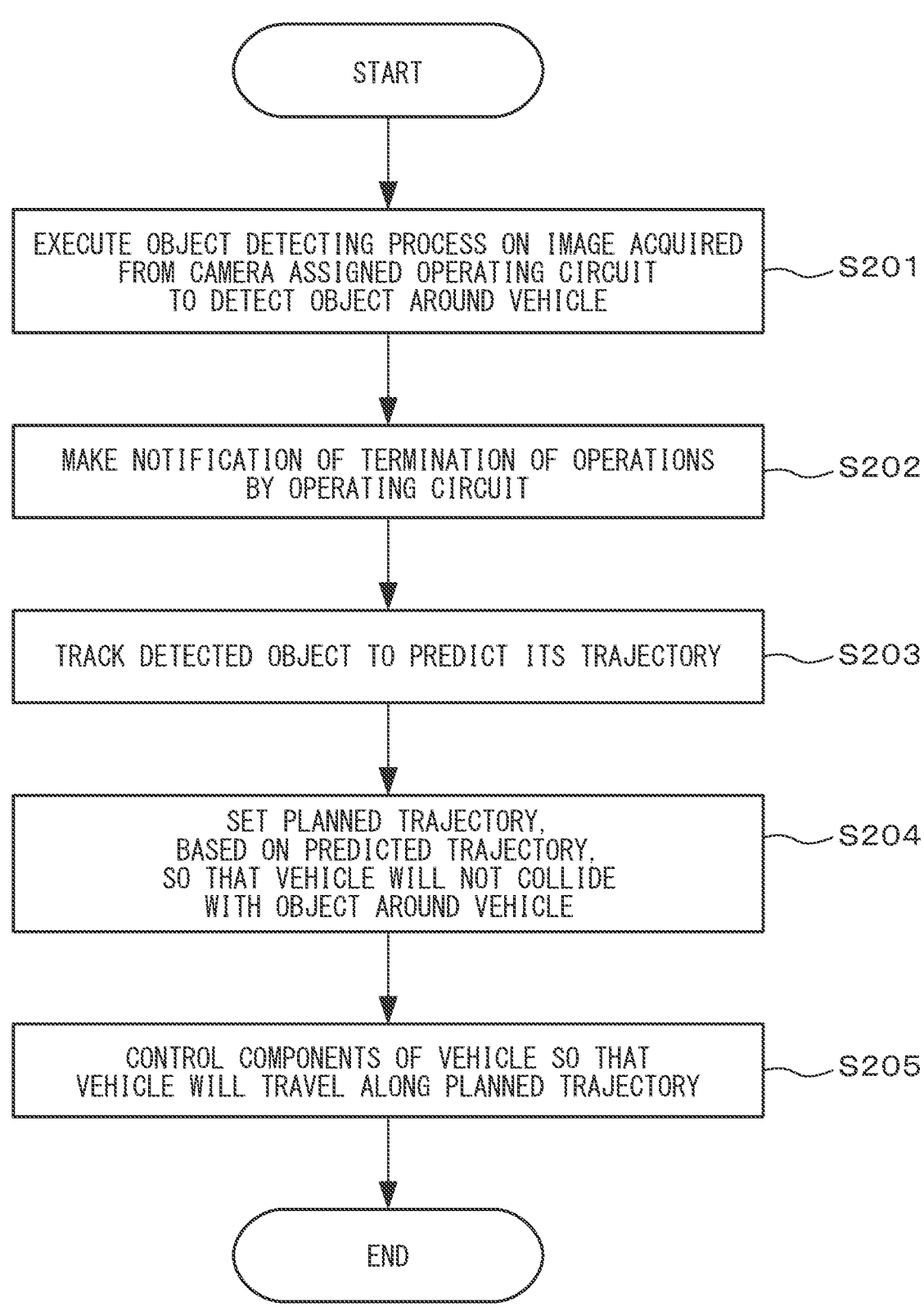
FIG. 6 is an operation flowchart of the vehicle control process.

FIG. 6 is an operation flowchart of the vehicle control process executed by the processor 24.

The object detecting unit 33 of the processor 24 uses the operating circuit 241 to execute the object detecting process on an image from one of the cameras 2-1 to 2-*n* to which the operating circuit 241 is assigned by the resource assigning unit 32, thereby detecting an object around the vehicle 10 represented in the image (step S201). Upon termination of operations by the operating circuit 241, the object detecting unit 33 notifies it to the resource assigning unit 32 (step S202).

The vehicle control unit 34 of the processor 24 tracks an object around the vehicle 10 detected from images from the cameras to predict the trajectory of this object (step S203). The vehicle control unit 34 sets a planned trajectory, based on the predicted trajectory, so that the vehicle 10 will not collide with the object around the vehicle (step S204). The vehicle control unit 34 controls components of the vehicle 10 so that the vehicle 10 will travel along the set planned trajectory (step S205). The processor 24 then terminates the vehicle control process.

As has been described above, the apparatus manages a shared resource that can be used in common by processes occurring asynchronously and periodically and being assigned degrees of priority. To this end, upon receiving target data for each of the processes, the apparatus temporarily stores the received data in a temporary storage unit. At every predetermined timing, the apparatus assigns the shared resource in descending order of priority to some of the processes for which target data is stored in the temporary storage unit. More specifically, in the situation that, at a timing of receiving data for a lower-priority process, the shared resource is not occupied by a process on other data and data for a higher-priority process has not been received, the apparatus does not immediately assign the shared resource to the lower-priority process and waits for a while. For this reason, the apparatus can decrease the possibility that the shared resource is occupied by a process at a timing of receiving data for a higher-priority process. Therefore the apparatus can reduce the wait time of a high-priority process even if processes having different degrees of priority occur asynchronously and periodically.

According to a modified example, degrees of priority of the processes using a shared resource may be dynamically changed.

Figure 7:
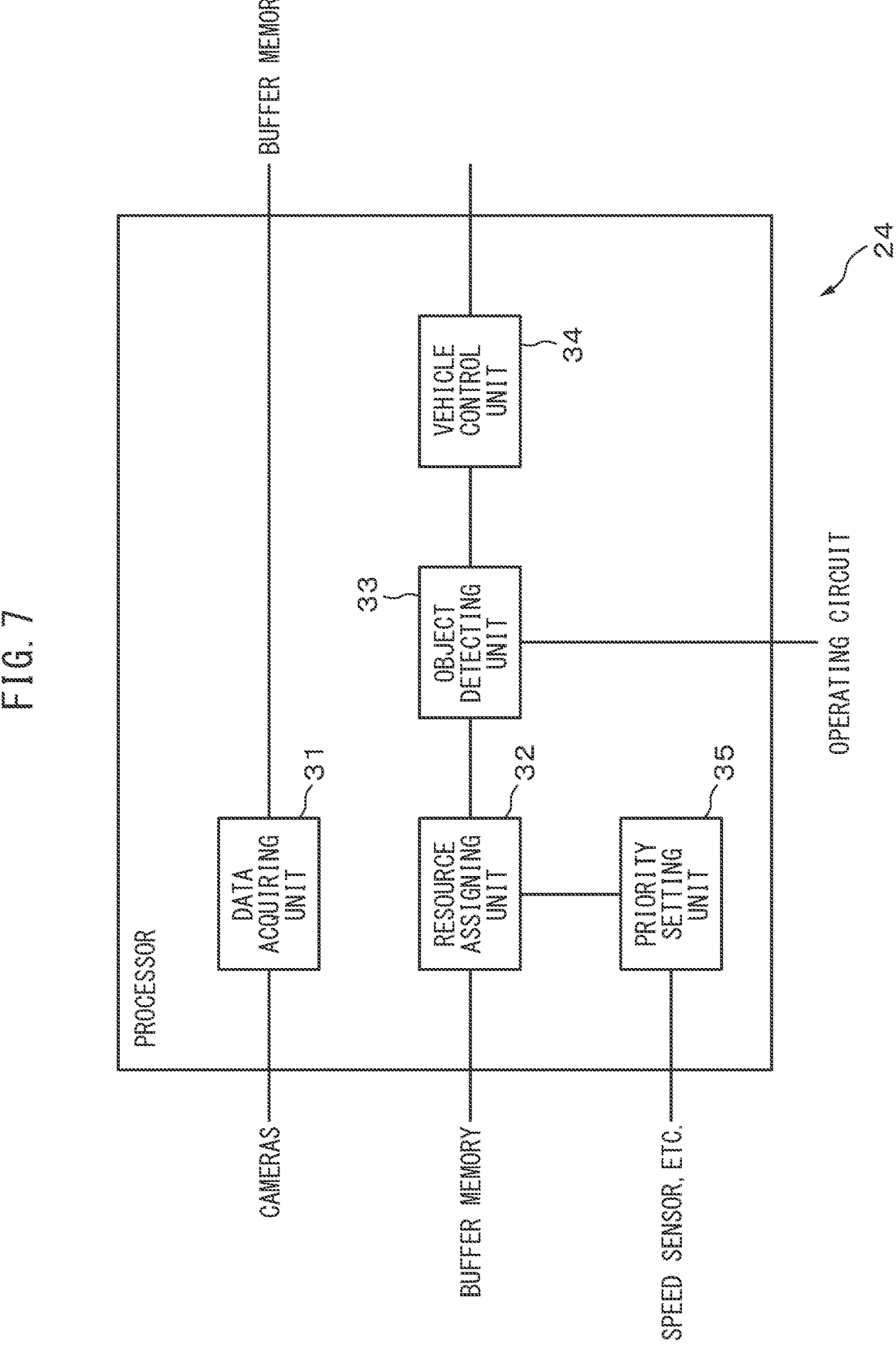
FIG. 7 is a functional block diagram of a processor of an electronic control unit according to a modified example.

FIG. 7 is a functional block diagram of the processor 24 of the ECU 3 according to this modified example. The processor 24 includes a data acquiring unit 31, a resource assigning unit 32, an object detecting unit 33, a vehicle control unit 34, and a priority setting unit 35. The modified example illustrated in FIG. 7 differs from the embodiment illustrated in FIG. 3 in that the processor 24 includes priority setting unit 35. Thus, the following describes the priority setting unit 35 and matters relevant thereto.

The priority setting unit 35 dynamically sets the degrees of priority of the object detecting processes to which the operating circuit 241 is assigned, depending on the state of travel of the vehicle 10. For example, when the vehicle 10 is traveling faster than a certain speed, it is preferable that the ECU 3 can detect an object relatively far from the vehicle 10 as early as possible. This is because the time required for the vehicle 10 to move to the object may be short even if the object is relatively far from the vehicle 10. When the speed of the vehicle 10 is low, e.g., when the vehicle 10 is traveling on a congested road, it is preferable to detect an object near the vehicle 10 prior to an object far from the vehicle 10.

Thus, the priority setting unit 35 compares the speed of the vehicle 10 acquired from a vehicle speed sensor (not illustrated) with a predetermined speed threshold. When the speed of the vehicle 10 is greater than the speed threshold, the priority setting unit 35 gives the highest priority to the object detecting processes on images from a camera, of the cameras 2-1 to 2-$n$, provided to capture a distant region ahead of the vehicle 10 (e.g., the camera 2-1). The priority setting unit 35 gives the second highest priority to the object detecting processes on images from a camera provided to capture a nearby region ahead of the vehicle 10 (e.g., the camera 2-2). The priority setting unit 35 gives the lowest priority to the object detecting processes on images from a camera provided to capture a region other than the regions ahead of the vehicle 10 (e.g., the camera 2-3).

Conversely, when the speed of the vehicle 10 is not greater than the speed threshold, the priority setting unit 35 gives the highest priority to the object detecting processes on images from a camera, of the cameras 2-1 to 2-$n$, provided to capture a nearby region ahead of the vehicle 10 (e.g., the camera 2-2). The priority setting unit 35 gives the second highest priority to the object detecting processes on images from a camera provided to capture a distant region ahead of the vehicle 10 (e.g., the camera 2-1).

The priority setting unit 35 may set the degrees of priority of the object detecting processes on images from the respective cameras, using information other than the vehicle speed. For example, the priority setting unit 35 may compare a congested section indicated by traffic information received from a wireless communication terminal (not illustrated) with the current position of the vehicle 10 measured by a GPS receiver (not illustrated) to determine whether the vehicle 10 is in the congested section. When the vehicle 10 is in a congested section, the priority setting unit 35 gives the highest priority to the object detecting processes on images from a camera, of the cameras 2-1 to 2-$n$, provided to capture a nearby region ahead of the vehicle 10, and gives the second highest priority to the object detecting processes on images from a camera provided to capture a distant region ahead of the vehicle 10. When the position of the vehicle 10 is not in any congested section, the priority setting unit 35 may give the highest priority to the object detecting processes on images from a camera, of the cameras 2-1 to 2-$n$, provided to capture a distant region ahead of the vehicle 10, and give the second highest priority to the object detecting processes on images from a camera provided to capture a nearby region ahead of the vehicle 10.

Additionally, the priority setting unit 35 may refer to the current position of the vehicle 10 measured by a GPS receiver (not illustrated) and map information to determine whether the vehicle 10 is within a predetermined distance of an intersection. When the vehicle 10 is within a predetermined distance of an intersection, a moving object (e.g., another vehicle or a person) may enter the course of the vehicle 10 from the side of the vehicle 10. Thus, in this case, the priority setting unit 35 may give the highest priority to the object detecting processes on images from a camera, of the cameras 2-1 to 2-$n$, provided to capture a nearby region ahead of the vehicle 10, and give the second highest priority to the object detecting processes on images from a camera provided to capture a distant region ahead of the vehicle 10. When the vehicle 10 is not within a predetermined distance of any intersection, the priority setting unit 35 may give the highest priority to the object detecting processes on images from a camera, of the cameras 2-1 to 2-$n$, provided to capture a distant region ahead of the vehicle 10, and give the second highest priority to the object detecting processes on images from a camera provided to capture a nearby region ahead of the vehicle 10.

Additionally, the priority setting unit 35 may set the degrees of priority, based on information on the position of the shift lever of the vehicle 10. For example, when the shift lever of the vehicle 10 is at a drive position, the vehicle 10 travels forward. Thus, the priority setting unit 35 may give the highest priority to the object detecting processes on images from a camera, of the cameras 2-1 to 2-$n$, provided to capture a region ahead of the vehicle 10. When the shift lever of the vehicle 10 is at a reverse position, the vehicle 10 travels backward. Thus, the priority setting unit 35 may give the highest priority to the object detecting processes on images from a camera, of the cameras 2-1 to 2-$n$, provided to capture a region behind the vehicle 10.

When the vehicle control unit 34 controls the vehicle 10 so that the vehicle 10 will pass another vehicle, the priority setting unit 35 may set the degrees of priority, depending on the positional relationship between the vehicle to be passed and the vehicle 10. For example, when the vehicle to be passed is traveling ahead of the vehicle 10, the priority setting unit 35 may give the highest priority to the object detecting processes on images from a camera, of the cameras 2-1 to 2-$n$, provided to capture a region ahead of the vehicle 10. When the vehicle to be passed is traveling beside or behind the vehicle 10, the priority setting unit 35 may give the highest priority to the object detecting processes on images from a camera, of the cameras 2-1 to 2-$n$, provided to capture a region beside or behind the vehicle 10. The priority setting unit 35 can determine the positional relationship between the vehicle 10 and another vehicle by referring to the result of tracking of the latter vehicle by the vehicle control unit 34.

Every time it changes the degrees of priority of the object detecting processes on images from the respective cameras, the priority setting unit 35 stores information indicating the changed degrees of priority in the memory 22.

Every time the resource assigning unit 32 assigns the operating circuit 241, the resource assigning unit 32 may refer to information indicating the degrees of priority and stored in the memory 22 to identify the degrees of priority of the object detecting processes on images from the respective cameras. Then, the resource assigning unit 32 may assign the operating circuit 241 in accordance with the identified degrees of priority.

According to this modified example, the ECU 3, which is an example of the apparatus for managing a resource, can appropriately set the degrees of priority of the processes that use the operating circuit 241, depending on the situation around the vehicle 10.

In the above-described embodiment or modified examples, operations for which the operating circuit 241 is used are not limited to the object detecting processes on images. For example, the resource assigning unit 32 may also assign the operating circuit 241 to a process to detect an object around the vehicle 10 from a ranging signal obtained by a distance sensor or a tracking process to track a detected object. In this case also, the degrees of priority are set for respective processes, and the resource assigning unit 32 successively assigns the operating circuit 241 to these processes in accordance with the degrees of priority.

The number of operating circuits that can be used by multiple processes in common may be two or more. In this case, at every predetermined timing, the resource assigning unit 32 assigns unoccupied operating circuits in descending order of priority to processes for which target data is stored in the buffer memory 23.

The shared resource that can be used in common by multiple processes is not limited to an operating circuit. For example, the shared resource may be a memory area that can be used by multiple processes.

The apparatus may be applied to any system other than a vehicle control system. The apparatus can be applied to various devices or systems that assign a shared resource to processes occurring asynchronously and periodically and being assigned degrees of priority to execute these processes.

As described above, those skilled in the art may make various modifications according to embodiments within the scope of the present invention.

What is claimed is:

1. An apparatus for managing a resource, comprising:
   a buffer memory; and
   a processor configured to
      store, when target image data for each of a plurality of processes is acquired from one of a plurality of cameras generating the target image data, the acquired target image data in the buffer memory, the processes occurring asynchronously and being assigned degrees of priority,
      assign a shared resource to some of the processes for which the target image data is stored in the buffer memory in descending order of the priority at predetermined timing intervals, the shared resource being usable for each of the processes, wherein the shared resource is an operating circuit that performs object detection on image data received from the buffer memory,
      executing a process of the plurality of processes having the highest priority with the assigned shared resource, and
      releasing the shared resource when executing the process is completed;
      wherein each of the predetermined timing intervals at which the shared resource is assigned to some of the processes is set to be the same as a timing interval that a camera among the plurality of cameras having the highest priority writes image data to the buffer memory;
      wherein only when an expected time required for executing a first process other than the process having the highest priority is shorter than a waiting time for release of the shared resource to a next timing of writing the image data generated by the camera having the highest priority to the buffer memory, the processor assigns the shared resource to the first process at the release of the shared resource.

2. The apparatus according to claim 1, wherein the target image data for the processes is sensor signals obtained from different sensors mounted on a vehicle.

3. The apparatus according to claim 2, wherein the processor is further configured to set the degrees of priority of the processes, depending on the state of travel of the vehicle.

4. A method for managing a resource, comprising:
   storing, when target image data for each of a plurality of processes is acquired from one of a plurality of cameras generating the target image data, the acquired target image data in a buffer memory, the processes occurring asynchronously and being assigned degrees of priority;
   assigning a shared resource to some of the processes for which the target data is stored in the buffer memory in descending order of the priority at every predetermined timing, the shared resource being usable for each of the processes, wherein the shared resource is an operating circuit that performs object detection on image data received from the buffer memory,
   executing a process of the plurality of processes having the highest priority with the assigned shared resource, and
   releasing the shared resource when executing the process is completed;
   wherein each of the predetermined timing intervals at which the shared resource is assigned to some of the processes is set to be the same as a timing interval that a camera among the plurality of cameras having the highest priority writes image data to the buffer memory;
   wherein only when an expected time required for executing a first process other than the process having the highest priority is shorter than a waiting time for release of the shared resource to a next timing of writing the image data generated by the camera having the highest priority to the buffer memory, assigning the shared resource to the first process at the release of the shared resource.

* * * * *